United States Patent
Cheng et al.

(10) Patent No.: US 11,877,196 B2
(45) Date of Patent: Jan. 16, 2024

(54) CELL AND BEAM SELECTION FOR CONDITIONAL HANDOVER PROCEDURE

(71) Applicant: QUALCOMM Incorporated, San Diego, CA (US)

(72) Inventors: Peng Cheng, Beijing (CN); Karthika Paladugu, San Diego, CA (US); Gavin Bernard Horn, La Jolla, CA (US); Huichun Liu, Beijing (CN); Prashanth Haridas Hande, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/309,593

(22) PCT Filed: Dec. 6, 2019

(86) PCT No.: PCT/CN2019/123589
§ 371 (c)(1),
(2) Date: Jun. 8, 2021

(87) PCT Pub. No.: WO2020/119597
PCT Pub. Date: Jun. 18, 2020

(65) Prior Publication Data
US 2022/0030484 A1 Jan. 27, 2022

(30) Foreign Application Priority Data

Dec. 6, 2019 (WO) ................ PCT/CN2019/123589

(51) Int. Cl.
*H04W 36/00* (2009.01)
*H04W 36/30* (2009.01)

(52) U.S. Cl.
CPC . *H04W 36/00837* (2018.08); *H04W 36/0058* (2018.08); *H04W 36/00835* (2018.08); *H04W 36/30* (2013.01)

(58) Field of Classification Search
USPC .......................... 455/436–455; 370/329–333
See application file for complete search history.

(56) References Cited

U.S. PATENT DOCUMENTS

2018/0338271 A1* 11/2018 Park ................... H04W 36/0077

FOREIGN PATENT DOCUMENTS

| CN | 107889145 A | 4/2018 |
| EP | 3206433 A1 | 8/2017 |

(Continued)

OTHER PUBLICATIONS

Supplementary European Search Report—EP19894724—Search Authority—Munich—dated Jul. 6, 2022.

(Continued)

*Primary Examiner* — Suhail Khan
(74) *Attorney, Agent, or Firm* — Harrity & Harrity, LLP

(57) ABSTRACT

Various aspects of the present disclosure generally relate to wireless communication. In some aspects, a user equipment (UE) may determine a set of cell quality measurements for a set of candidate target cells. The UE may select a target cell, from the set of candidate target cells, and a beam, of one or more beams of the target cell, for a conditional handover procedure and based at least in part on the set of cell quality measurements. The UE may perform the conditional handover procedure to transfer from a source cell to the target cell based at least in part on selecting the target cell and the beam. Numerous other aspects are provided.

31 Claims, 10 Drawing Sheets

(56) References Cited

FOREIGN PATENT DOCUMENTS

| WO | WO-2018083649 A1 | 5/2018 |
|----|------------------|--------|
| WO | 2018132538 A1 | 7/2018 |
| WO | WO-2018175721 A1 | 9/2018 |
| WO | 2018203815 A1 | 11/2018 |
| WO | 2018203816 A1 | 11/2018 |
| WO | 2018210234 A1 | 11/2018 |

OTHER PUBLICATIONS

Huawei, et al., "Measurement and Mobility Considering Beamforming", 3GPP TSG-RAN2 Meeting #97, R2-1701130, Feb. 17, 2017 (Feb. 17, 2017), 6 Pages, the whole document.
International Search Report and Written Opinion—PCT/CN2018/119999—ISA/EPO—dated Sep. 9, 2019.
International Search Report and Written Opinion—PCT/CN2019/123589—ISA/EPO—dated Mar. 10, 2020.
LG Electronics Inc: "Consideration to Support Conditional HO", 3GPP TSG-RAN WG2 Meeting#104, R2-1818332, Nov. 16, 2018 (Nov. 16, 2018), 5 Pages, Section 2.
Qualcomm Incorporated: "Remaining Issues of Beam Selection for Handover Access", R2-1711365, 3GPP TSG-RAN WG2 Meeting #99bis, Sep. 29, 2017, 4 pages.
Samsung: "Introduction of Conditional handover", 3GPP TSG-RAN WG2 Meeting #99bis, R2-1711413, Oct. 13, 2017 (Oct. 13, 2017), pp. 1-3, Sections 2-3.

\* cited by examiner

CELL AND BEAM SELECTION FOR CONDITIONAL HANDOVER PROCEDURE

CROSS-REFERENCE TO RELATED APPLICATIONS

This application is a 371 national stage of PCT Application No. PCT/CN2019/123589, filed Dec. 6, 2019, entitled "CELL AND BEAM SELECTION FOR CONDITIONAL HANDOVER PROCEDURE," which claims priority to Patent Cooperation Treaty (PCT) Application No. PCT/CN2018/119999, filed on Dec. 10, 2018, entitled "CELL AND BEAM SELECTION FOR CONDITIONAL HANDOVER PROCEDURE," which are hereby expressly incorporated by reference herein.

FIELD OF THE DISCLOSURE

Aspects of the present disclosure generally relate to wireless communication, and to techniques and apparatuses for cell and beam selection for a conditional handover procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a set of cell quality measurements for a set of candidate target cells. The method may include selecting a target cell, from the set of candidate target cells, and a beam, of one or more beams of the target cell, for a conditional handover procedure and based at least in part on the set of cell quality measurements. The method may include performing the conditional handover procedure to transfer from a source cell to the target cell based at least in part on selecting the target cell and the beam.

In some aspects, a UE for wireless communication may include memory and one or more processors operatively coupled to the memory. The memory and the one or more processors may be configured to determine a set of cell quality measurements for a set of candidate target cells. The memory and the one or more processors may be configured to select a target cell, from the set of candidate target cells, and a beam, of one or more beams of the target cell, for a conditional handover procedure and based at least in part on the set of cell quality measurements. The memory and the one or more processors may be configured to perform the conditional handover procedure to transfer from a source cell to the target cell based at least in part on selecting the target cell and the beam.

In some aspects, a non-transitory computer-readable medium may store one or more instructions for wireless communication. The one or more instructions, when executed by one or more processors of a UE, may cause the one or more processors to determine a set of cell quality measurements for a set of candidate target cells. The one or more instructions, when executed by the one or more processors of the UE, may cause the one or more processors to select a target cell, from the set of candidate target cells, and a beam, of one or more beams of the target cell, for a conditional handover procedure and based at least in part on the set of cell quality measurements. The one or more instructions, when executed by the one or more processors of the UE, may cause the one or more processors to perform the conditional handover procedure to transfer from a source cell to the target cell based at least in part on selecting the target cell and the beam.

In some aspects, an apparatus for wireless communication may include means for determining a set of cell quality measurements for a set of candidate target cells. The apparatus may include means for selecting a target cell, from the set of candidate target cells, and a beam, of one or more beams of the target cell, for a conditional handover procedure and based at least in part on the set of cell quality measurements. The apparatus may include means for performing the conditional handover procedure to transfer from a source cell to the target cell based at least in part on selecting the target cell and the beam.

In some aspects, a method of wireless communication, performed by a source cell, may include transmitting, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure. The method may include communicating with the UE or the target cell, of the plurality of candidate target cells, to in connection with performance of the conditional handover procedure after transmitting the configuration message.

In some aspects, a source cell for wireless communication may include memory and one or more processors operatively coupled to the memory. The memory and the one or more processors may be configured to transmit, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure. The memory and the one or more processors may be configured to communicate with the UE or the target cell, of the plurality of candidate target cells, to in connection with performance of the conditional handover procedure after transmitting the configuration message.

In some aspects, a non-transitory computer-readable medium may store one or more instructions for wireless communication. The one or more instructions, when executed by one or more processors of a source cell, may cause the one or more processors to transmit, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure. The one or more instructions, when executed by the one or more processors of the source cell, may cause the one or more processors to communicate with the UE or the target cell, of the plurality of candidate target cells, to in connection with performance of the conditional handover procedure after transmitting the configuration message.

In some aspects, an apparatus for wireless communication may include means for transmitting, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure. The apparatus may include means for communicating with the UE or the target cell, of the plurality of candidate target cells, to in connection with performance of the conditional handover procedure after transmitting the configuration message.

Aspects generally include a method, apparatus, system, computer program product, non-transitory computer-readable medium, user equipment, base station, wireless communication device, source cell, target cell, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
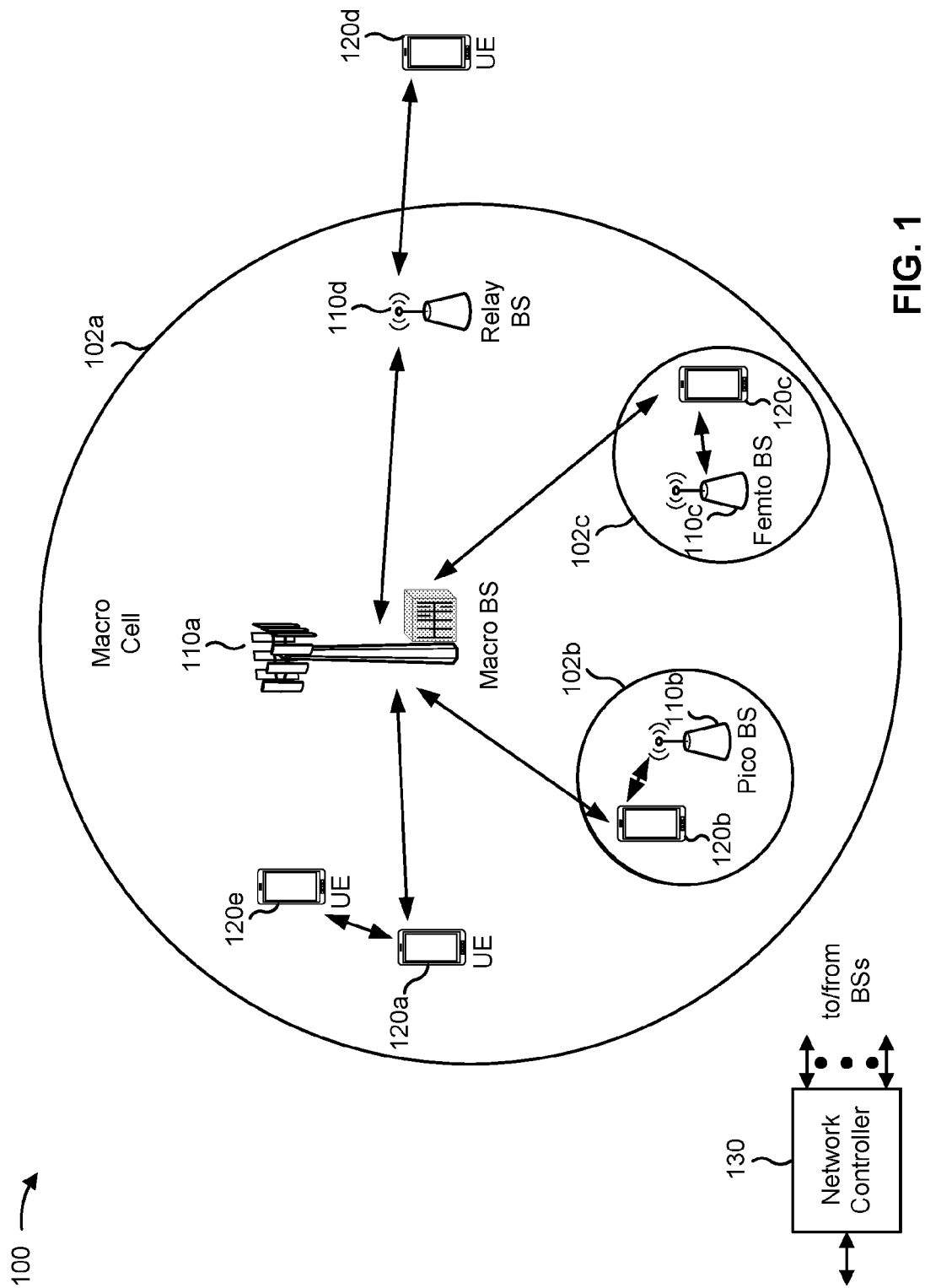
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
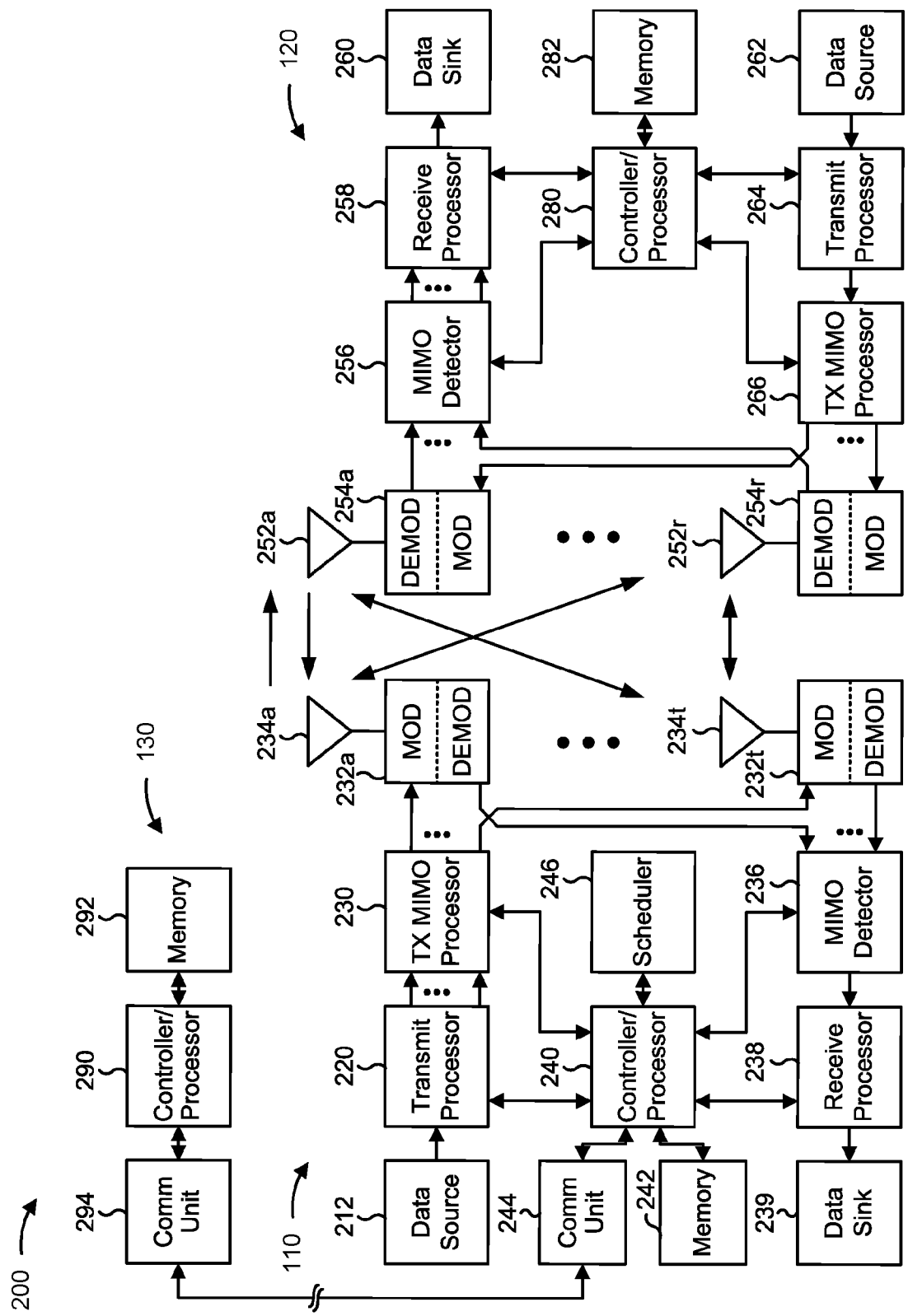
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cell and beam selection for a conditional handover procedure, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a set of cell quality measurements for a set of candidate target cells, means for selecting a target cell, from the set of candidate target cells, and a beam, of one or more beams of the target cell, for a conditional handover procedure and based at least in part on the set of cell quality measurements, means for performing the conditional handover procedure to transfer from a source cell to the target cell based at least in part on selecting the target cell and the beam, and/or the like. In some aspects, such means may include one or more components of UE 120 described in connection with FIG. 2.

In some aspects, a source cell (e.g., base station 110) may include means for transmitting, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure, means for communicating with the UE or the target cell, of the plurality of candidate target cells, to in connection with performance of the conditional handover procedure after transmitting the configuration message, and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
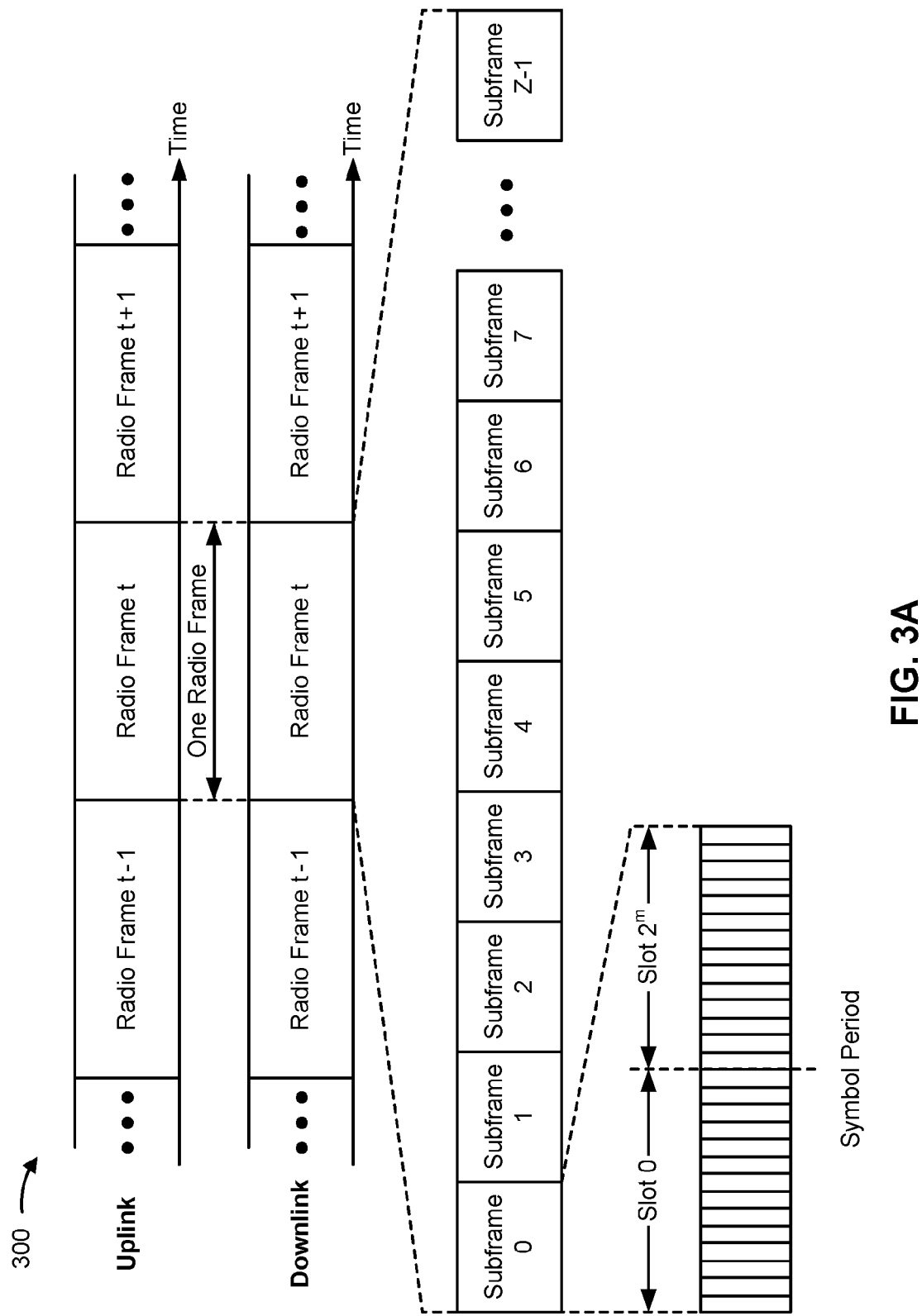
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
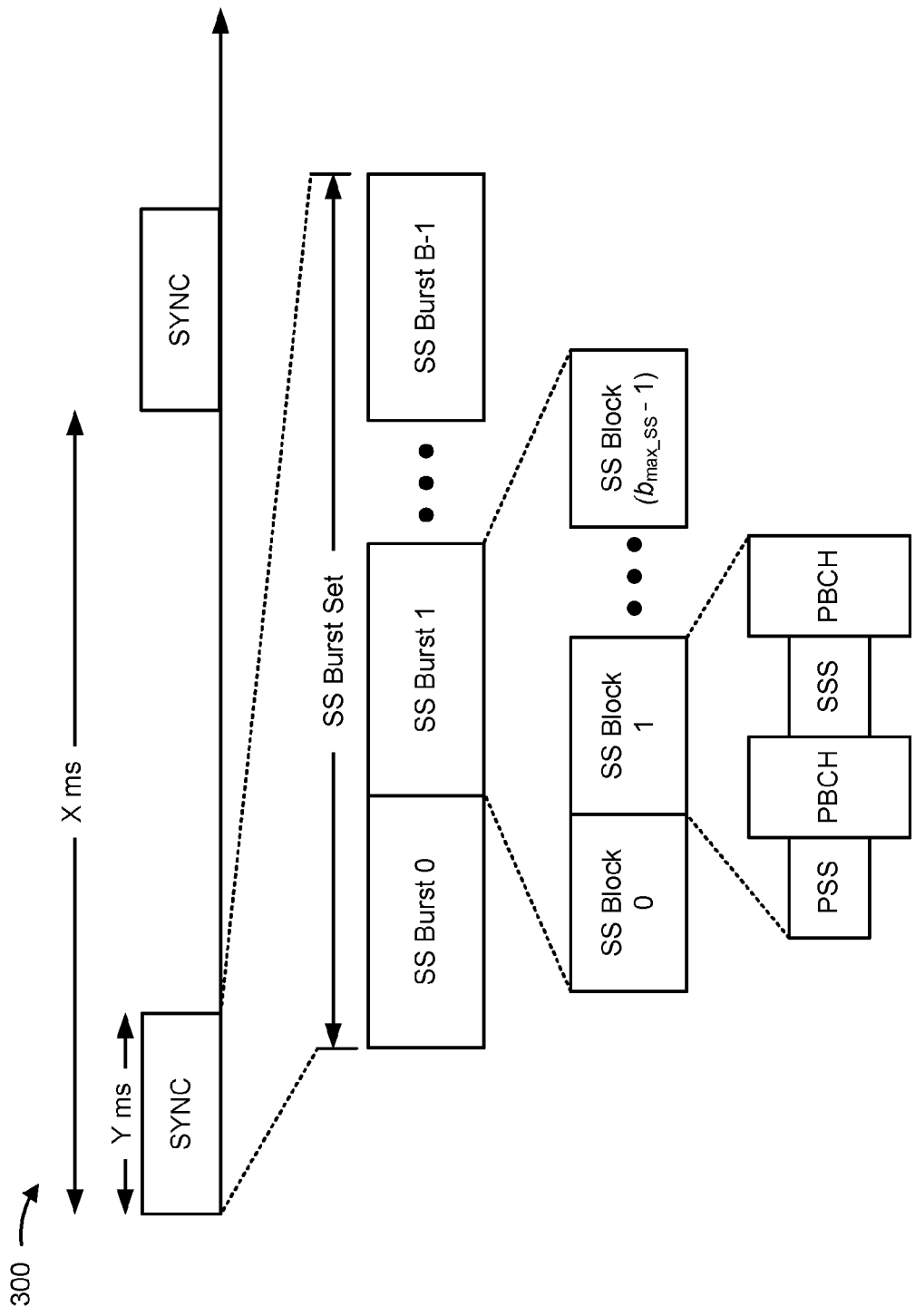
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_ss}$−1), where $b_{max\_ss}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
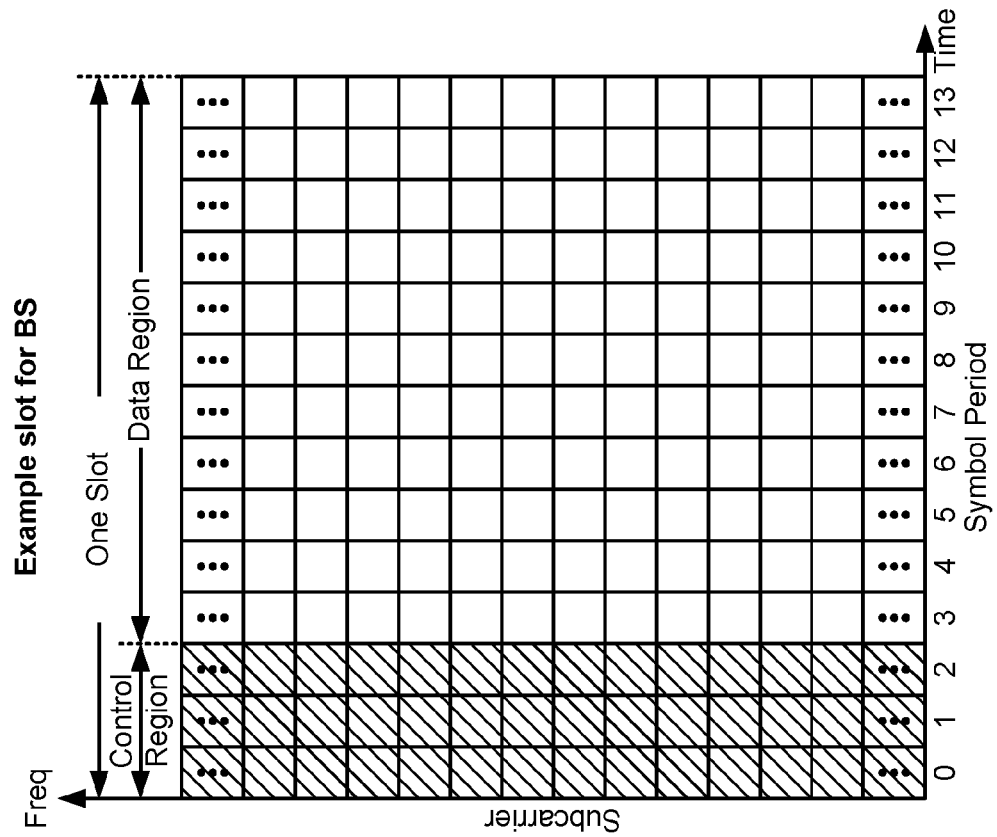
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using time division duplexing (TDD). NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
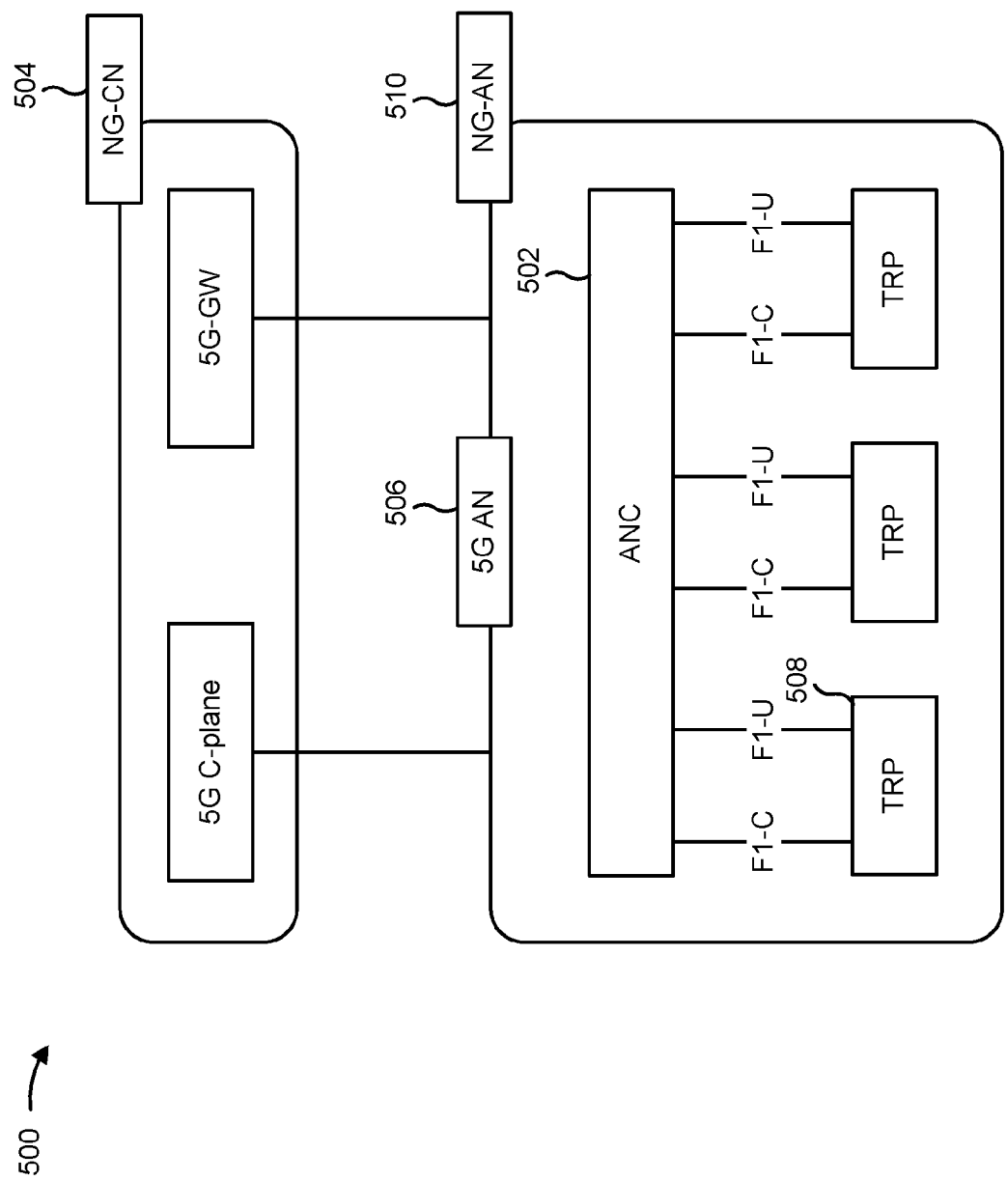
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
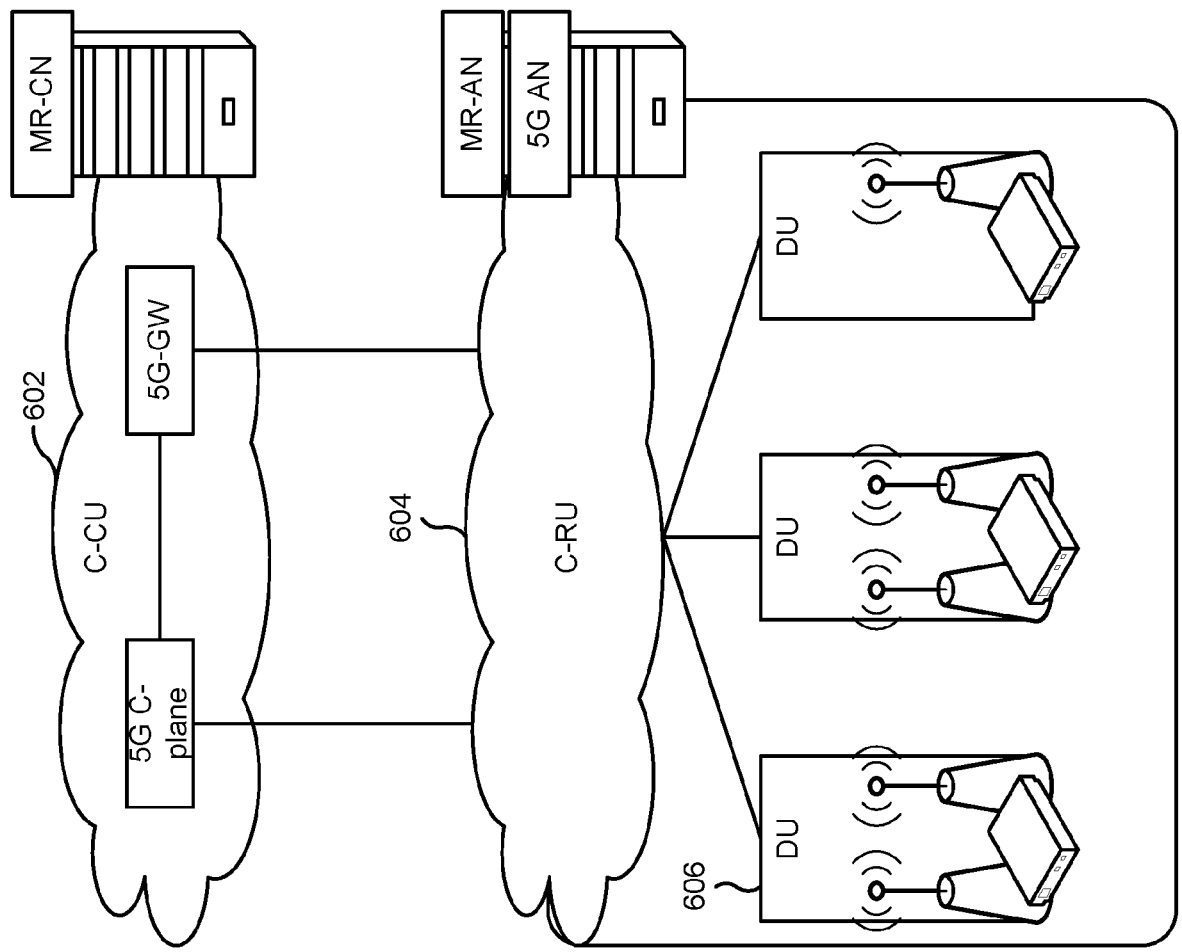
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as NR, a conditional handover procedure may be used for improved mobility robustness relative to other techniques. For example, by implementing a conditional handover procedure, a network may reduce a likelihood of radio link failure for a UE and a BS in a scenario where a quality of a link between the UE and the BS degrades too quickly to apply a forward handover procedure. In a conditional handover procedure, the BS may proactively provide a conditional handover configuration to the UE. For example, the BS may provide the conditional handover configuration before a handover triggering event. In this case, the conditional handover configuration may include a configuration of a candidate target cell, an indication of a condition to trigger the conditional handover procedure, and/or the like. When the condition to trigger the conditional handover procedure is satisfied, the UE may initiate a random access channel procedure to transfer to a target cell. In this way, a handover delay is reduced relative to a forward handover procedure, where a UE may send a measurement report and/or receive a radio resource control (RRC) configuration message before performing the forward handover procedure.

Some aspects described herein enable cell and beam selection for a conditional handover procedure when a plurality of candidate target cells are available for a handover. For example, the UE may concurrently perform cell and beam selection, sequentially perform cell and beam selection, and/or the like. In this way, the UE enables completion of a conditional handover procedure when the UE has a plurality of candidate target cells and/or a plurality of beams available for use, thereby increasing flexibility in implementation, increasing a likelihood of finding a target cell and/or a beam to use, improving a network performance by increasing a quantity of options for target cells and/or beams, and/or the like.

Figure 7:
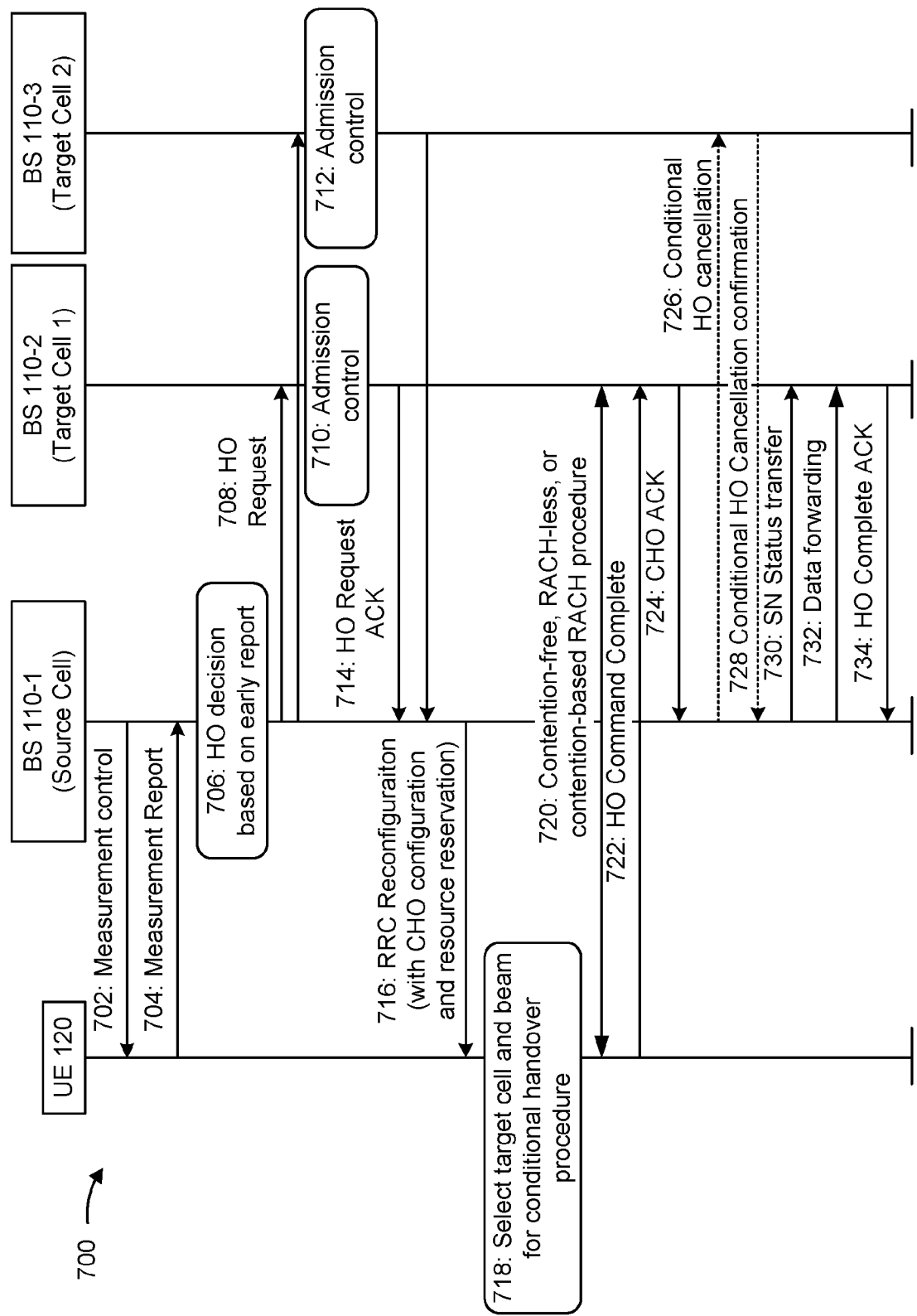
FIG. 7 is a diagram illustrating an example of cell and beam selection for a conditional handover procedure, in accordance with various aspects of the present disclosure.

FIG. 7 is a diagram illustrating an example 700 of cell and beam selection for a conditional handover procedure, in accordance with various aspects of the present disclosure. As shown in FIG. 7, example 700 may include a UE 120 and a set of BSs 110-1 through 110-3. For example, BS 110-1 may be a source cell, BS 110-2 may be a first target cell, and BS 110-3 may be a second target cell.

As further shown in FIG. 7, and by reference numbers 702 and 704, UE 120 may receive a measurement control message from the source cell, and may provide a measurement report to the source cell. For example, the source cell may provide a signal to UE 120 to enable UE 120 to measure a signal strength of the signal and report the signal strength of the signal. In some aspects, the measurement control message may include information identifying a configuration for UE 120. For example, the source cell may indicate which parameter UE 120 is to determine, such as a signal strength parameter (e.g., a reference signal received power (RSRP)), a signal quality parameter (e.g., a reference signal received quality (RSRQ)), and or the like. In this case, UE 120 may report that the parameter does not satisfy a threshold, which may trigger the source cell to determine an availability of the target cells for a handover. In some aspects, the source cell may provide information identifying the threshold. In some aspects, UE 120 may obtain stored information identifying the threshold.

As further shown in FIG. 7, and by reference number 706, the source cell may make a handover decision based at least in part on the measurement report. For example, the source cell may determine, based at least in part on the measurement report, that a condition for performing a conditional handover is satisfied. In this case, the source cell may determine that UE 120 is to be handed over from the source cell to a target cell. In some aspects, the source cell may determine that a condition for performing a conditional handover is satisfied based at least in part on a signal quality of a link between UE 120 and the source cell not satisfying a threshold. Additionally, or alternatively, the source cell may determine that the condition for performing the conditional handover is satisfied based at least in part on a beam quality of a beam used by UE 120 and/or the source cell not satisfying a threshold.

As further shown in FIG. 7, and by reference numbers 708, 710, 712, and 714, the source cell may provide a handover request to the first target cell and/or the second target cell, and may receive a handover request acknowledgement. For example, the source cell may provide the handover request to the first target cell and the second target cell, which may be candidate target cells, and the first target cell and the second target cell may perform an admission control procedure. In this case, the first target cell and the second target cell may determine whether UE 120 may be connected to the first target cell and the second target cell, respectively (e.g., based at least in part on a cell congestion, a cell status, and/or the like). Based at least in part on performing admission control, the first target cell and the second target cell may provide an acknowledgement to the source cell to indicate that UE 120 may transfer to the first target cell and/or the second target cell.

As further shown in FIG. 7, and by reference number 716, the source cell may provide, to UE 120, a radio resource control (RRC) reconfiguration message with a conditional handover configuration and a resource reservation configuration. For example, the source cell may provide the RRC reconfiguration message to identify a configuration for a conditional handover, to alter a configuration for the conditional handover, and/or the like. In some aspects, the source cell may provide the RRC reconfiguration message to identify a set of candidate target cells (e.g., the first target cell, the second target cell, and/or the like), a conditional handover condition (e.g., a threshold cell quality for selecting a target cell and determining to transfer to the target cell), and/or the like. In some aspects, the source cell may identify an offset value. For example, the source cell may identify an event trigger configuration offset value that indicates an offset to be applied to a threshold corresponding to a measurement event that triggers a measurement report. In some aspects, the source cell may identify a priority of a candidate target cell. For example, the source cell may identify a plurality of priorities of a plurality of candidate target cells to enable UE 120 to determine which candidate target cell, of the plurality of candidate target cells, to which to transfer when performing a conditional handover.

In some aspects, the source cell may provide the RRC reconfiguration message to convey a measurement identifier. A measurement identifier may identify a measurement configuration that links a measurement object and a reporting configuration. In this case, UE 120 may use the measurement identifier to determine which object is to be measured (e.g., which parameter), and which threshold triggers reporting of a measurement of the object. In this way, the source cell may update conditions associated with performing a conditional handover. For example, the source cell may include an information element identifying a threshold criterion for handing over from the source cell to a candidate target cell, and UE 120 may use the threshold criterion to select a candidate target cell and a beam. In some aspects, UE 120 may determine, based at least in part on the information element, a candidate cell threshold offset, a handover priority identifier, and/or the like.

In some aspects, the source cell may indicate, to UE 120, that a conditional handover is to be triggered based at least in part on a quality of a beam identified in a random access channel configuration. For example, the source cell may include information identifying a candidate target cell identifier, a beam threshold offset, a handover priority indicator, and/or the like. Additionally, or alternatively, the source cell may indicate that the conditional handover is to be triggered based at least in part on a quality of a beam identified in a conditional handover condition identifier. In this case, the source cell may include information identifying a candidate cell identifier, a beam list (e.g., a channel state information reference signal (CSI-RS), a synchronization signal block (SSB), and/or the like), a beam threshold, a handover priority indicator, and/or the like.

As further shown in FIG. 7, and by reference number 718, UE 120 may select a target cell, of a plurality of candidate target cells, and a beam for a conditional handover procedure. For example, UE 120 may evaluate the plurality of candidate target cells to determine whether at least one candidate target cell satisfies a condition for performing a conditional handover to the at least one candidate target cell. In this case, the condition may relate to a candidate target cell having a cell quality metric that satisfies a threshold, a beam quality metric that satisfies a threshold, and/or the like, as described herein. Based at least in part on evaluating the plurality of candidate target cells, UE 120 may select a beam associated with the first target cell, a beam associated with the second target cell, and/or the like.

In some aspects, UE 120 may perform cell selection, and then may subsequently perform beam selection. For example, UE 120 may select a target cell from a plurality of candidate target cells configured based at least in part on the RRC reconfiguration message from the source cell. In this case, UE 120 may subsequently select a beam, from a group of one or more beams of a selected target cell, to perform a random access channel procedure to transfer to the selected target cell. For example, UE 120 may select the beam based at least in part on a beam list received from the source cell that identifies the one or more beams of the selected target cell. In some aspects, UE 120 may select a beam based at least in part on a threshold. For example, UE 120 may determine that a particular beam satisfies a threshold beam quality, and may select the particular beam. In contrast, if no beams satisfy the threshold beam quality, UE 120 may fall back to a contention based random access (CBRA) procedure, and may select any beam of the selected target cell based at least in part on falling back to the CBRA procedure. In some aspects, UE 120 may perform cell selection and beam selection concurrently for a conditional handover. For example, UE 120 may process information relating to both a target cell and a beam associated therewith to perform cell selection and beam selection.

In some aspects, UE 120 may determine a cell quality, and may select a target cell and/or a beam based at least in part on the cell quality. For example, when candidate target cells are each associated with a single beam, UE 120 may determine that a single candidate target cell is associated with a cell quality satisfying a threshold, and may select the single candidate target cell as the target cell. Additionally, or alternatively, when UE 120 determines that a plurality of candidate target cells are associated with cell qualities that satisfy a threshold, UE 120 may select a particular candidate target cell associated with a best cell quality relative to other candidate target cells. Additionally, or alternatively, UE 120 may select the target cell based at least in part on an index value. For example, UE 120 may select a first candidate target cell with a cell quality that satisfies a threshold. In this case, the first candidate target cell may be sequentially first with respect to a cell index, a frequency index, an identified order in a cell list, and/or the like. Additionally, or alternatively, UE 120 may select the target cell based at least in part on a prioritization. For example, UE 120 may select a candidate target cell, which has a cell quality that satisfies a threshold, associated with a highest priority relative to other candidate target cells with cell qualities satisfying the threshold.

In some aspects, UE 120 may select a target cell based at least in part on a comparison of a plurality of beams of different candidate target cells. For example, when UE 120 is configured with a plurality of beams for each candidate target cell, UE 120 may compare a best beam with respect to a beam quality metric to select a candidate target cell as a target cell. In this case, UE 120 may select a candidate target cell based at least in part on a best beam of the candidate target cell (e.g., a beam with a highest beam quality metric of beams of the candidate target cell) having a higher beam quality metric than other best beams of other candidate target cells. Additionally, or alternatively, UE 120 may select a first candidate target cell that has a best beam, with respect to a beam quality metric, that satisfies a threshold for beam quality. Additionally, or alternatively, UE 120 may select a candidate target cell with a highest priority among candidate target cells whose best beam, with respect to a beam quality metric, satisfies a threshold for the beam quality metric.

In some aspects, UE 120 may select a beam of a plurality of beams of a plurality of candidate target cells. For example, when UE 120 is configured with a plurality of beams for each candidate target cell, UE 120 may perform beam selection for all beams of all candidate target cells. In this case, UE 120 may select a beam with a highest beam quality metric, a sequentially first beam (e.g., with respect to an index value) that satisfies a beam quality threshold, a beam associated with a highest priority for an associated cell, and/or the like.

In some aspects, UE 120 may select a beam based at least in part on an averaging procedure. For example, UE 120 may determine a beam set quality for each candidate target cell based at least in part on a plurality of beam qualities of a plurality of beams of respective candidate target cells, and may select a candidate target cell based at least in part on a corresponding beam set quality. In some aspects, UE 120 may select a candidate target cell with a highest beam set quality relative to other candidate target cells. Additionally, or alternatively, UE 120 may select a sequentially first candidate target cell, with respect to an index value, that has a beam set quality that satisfies a threshold. Additionally, or alternatively, UE 120 may select a candidate target cell, which has a beam set quality that satisfies a threshold, that has a highest priority relative to other candidate target cells. In some aspects, UE 120 may report an event triggering a handover to the source cell. For example, UE 120 may report one or more measurements associated with a cell quality when the cell quality triggers the handover.

As further shown in FIG. 7, and by reference number 720, based at least in part on selecting, for example, the first target cell as the target cell for the conditional handover procedure, UE 120 may communicate with the first target cell to transfer to the first target cell. For example, UE 120 may exchange a set of messages with the first target cell in accordance with an access procedure to connect to the first target cell. In some aspects, the access procedure may be a contention-free access procedure, a random access channel (RACH)-less access procedure, a contention-based RACH procedure, and/or the like. In this way, UE 120 determines whether UE 120 is able to access the first target cell to hand over to the first target cell in a conditional handover scenario.

As further shown in FIG. 7, and by reference numbers 722 and 724, UE 120 may provide an indication to the first target cell that a handover command is complete and may trigger a response message based at least in part on performing the conditional handover procedure. For example, based at least in part on performing the access procedure, UE 120 may indicate that UE 120 is connecting to the first target cell, and not abandoning a connection to the first target cell to remain on the source cell. In this case, the first target cell may provide, to the source cell, an acknowledgement message acknowledging that UE 120 is connecting to the first target cell (shown as a "CHO ACK"). In this way, the first target cell enables the source cell to begin transfer of information to the first target cell, which may enable the first target cell to become a serving cell for UE 120.

In another example, the conditional handover procedure may fail. For example, UE 120 may fail to complete an access procedure with the first target cell, UE 120 may determine to remain on the source cell, and/or the like. In this case, based at least in part on a failure of the conditional handover procedure, UE 120 may be configured to re-measure a plurality of candidate target cells (e.g., the first target cell, the second target cell, and/or the like) and respective beams, and may re-evaluate and select a particular target cell and a particular beam. For example, UE 120 may select a second best candidate target cell (e.g., the second target cell) with respect to a cell index, a cell quality, a cell priority, and/or the like.

As further shown in FIG. 7, and by reference numbers 726 and 728, in some aspects, the source cell may provide a conditional handover cancellation message to the second target cell, and may receive a response message. For example, the source cell may provide the conditional handover cancellation message to indicate that UE 120 is not transferring to the second target cell (e.g., based at least in part on receiving the acknowledgement message acknowledging that UE 120 is successfully connected to the first target cell). In this case, the source cell causes an end to the admission control procedure of the second target cell.

As further shown in FIG. 7, and by reference numbers 730 and 732, the source cell may provide a sequence number status transfer message to the first target cell and may perform data forwarding to the first target cell. For example, based at least in part on receiving the acknowledgement message acknowledging that UE 120 is connecting to the first target cell, the source cell may provide the sequence number status, and may forward data for UE 120 to the first target cell to enable a handover to the first target cell and avoid data being dropped from transmission to UE 120.

As further shown in FIG. 7, and by reference number 734, the first target cell may provide an acknowledgement message indicating that the conditional handover procedure is complete. For example, the first target cell may indicate to the source cell that the conditional handover procedure is complete, and that the source cell may cease data forwarding, release information relating to UE 120 (e.g., a UE context), and/or the like.

As indicated above, FIG. 7 is provided as an example. Other examples may differ from what is described with respect to FIG. 7.

Figure 8:
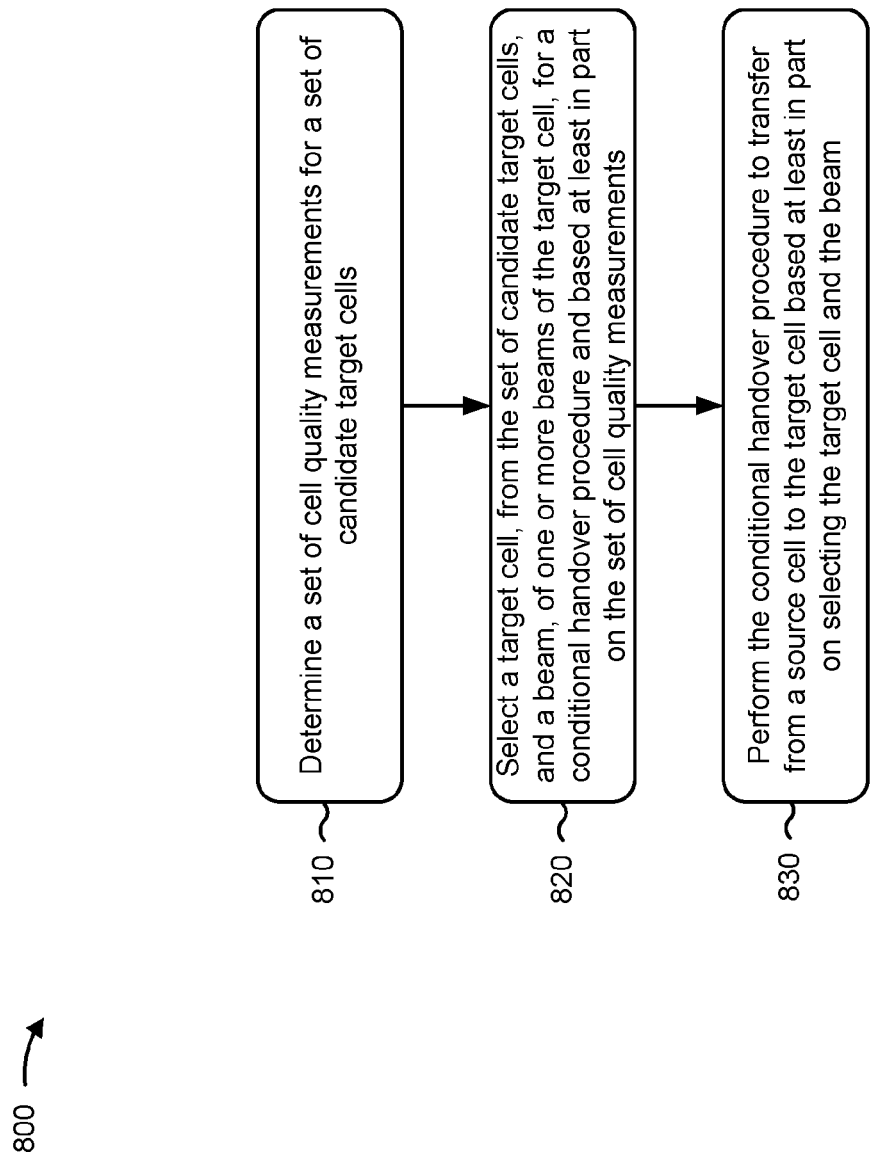
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs cell and beam selection for a conditional handover procedure.

As shown in FIG. 8, in some aspects, process 800 may include determining a set of cell quality measurements for a set of candidate target cells (block 810). For example, the UE (e.g., using controller/processor 280 and/or the like) may determine a set of cell quality measurements for a set of candidate target cells, as described in more detail above.

As shown in FIG. 8, in some aspects, process 800 may include selecting a target cell, from the set of candidate target cells, and a beam, of one or more beams of the target cell, for a conditional handover procedure and based at least in part on the set of cell quality measurements (block 820). For example, the UE (e.g., using controller/processor 280 and/or the like) may select a target cell, from the set of candidate target cells, and a beam, of one or more beams of the target cell, for a conditional handover procedure and based at least in part on the set of cell quality measurements, as described in more detail above.

As shown in FIG. 8, in some aspects, process 800 may include performing the conditional handover procedure to transfer from a source cell to the target cell based at least in part on selecting the target cell and the beam (block 830). For example, the UE (e.g., using antenna 252, DEMOD 254, MIMO detector 256, receive processor 258, controller/processor 280, transmit processor 264, TX MIMO processor 266, MOD 254, antenna 252, and/or the like) may perform the conditional handover procedure to transfer from a source cell to the target cell based at least in part on selecting the target cell and the beam, as described in more detail above.

Process 800 may include additional aspects, such as any single aspect and/or any combination of aspects described below and/or in connection with one or more other processes described elsewhere herein.

In a first aspect, the UE is configured to determine the set of cell quality measurements based at least in part on at least one of a per-beam layer 1 (L1) filtered measurement or a cell-level layer 3 (L3) measurement. In a second aspect, alone or in combination with the first aspect, the UE is configured to select the target cell based at least in part on the target cell having a higher cell quality than one or more other candidate target cells of the set of candidate target cells. In a third aspect, alone or in combination with one or more of the first and second aspects, the UE is configured to select the target cell based at least in part on an index value of the target cell and based at least in part on a cell quality of the target cell satisfying a threshold.

In a fourth aspect, alone or in combination with one or more of the first through third aspects, the UE is configured to select the target cell based at least in part on a cell priority of the target cell and based at least in part on a cell quality of the target cell satisfying a threshold. In a fifth aspect, alone or in combination with one or more of the first through fourth aspects, the UE is configured to select the target cell based at least in part on a comparison of a single beam of each candidate target cell, of the set of candidate target cells, associated with a cell quality that satisfies a threshold. In a sixth aspect, alone or in combination with one or more of the first through fifth aspects, the UE is configured to select the target cell based at least in part on a beam quality of the beam of the target cell relative to other beam qualities of other candidate target cells of the set of candidate target cells.

In a seventh aspect, alone or in combination with one or more of the first through sixth aspects, the UE is configured to select the target cell based at least in part on an index value of the target cell and based at least in part on a beam quality of the beam of the target cell satisfying a threshold. In an eighth aspect, alone or in combination with one or more of the first through seventh aspects, the UE is configured to select the target cell based at least in part on a priority of the target cell and based at least in part on a beam quality of the beam of the target cell satisfying a threshold. In a ninth aspect, alone or in combination with one or more of the first through eighth aspects, the UE is configured to select the target cell based at least in part on a comparison of at least one beam of a candidate target cell, of the set of candidate target cells, associated with a beam quality that satisfies a threshold.

In a tenth aspect, alone or in combination with one or more of the first through ninth aspects, the UE is configured to select the beam based at least in part on a beam quality and to select the target cell associated with the beam. In an eleventh aspect, alone or in combination with one or more of the first through tenth aspects, the UE is configured to select the beam based at least in part on a beam quality and an index value of the beam and to select the target cell associated with the beam. In a twelfth aspect, alone or in combination with one or more of the first through eleventh aspects, the UE is configured to select the beam based at least in part on a beam quality and a priority of the beam and to select the target cell associated with the beam.

In a thirteenth aspect, alone or in combination with one or more of the first through twelfth aspects, the UE is configured to select the target cell based at least in part on a beam set quality associated with a plurality of beams of the target cell. In a fourteenth aspect, alone or in combination with one or more of the first through thirteenth aspects, the UE is configured to select the target cell based at least in part on a beam set quality relative to other beam set qualities of other candidate target cells of the set of candidate target cells. In a fifteenth aspect, alone or in combination with one or more of the first through fourteenth aspects, the UE is configured to select the target cell based at least in part on a beam set quality satisfying a threshold and an index of the target cell.

In a sixteenth aspect, alone or in combination with one or more of the first through fifteenth aspects, the UE is configured to select the target cell based at least in part on a beam set quality satisfying a threshold and a priority of the target cell. In a seventeenth aspect, alone or in combination with one or more of the first through sixteenth aspects, the UE is configured to select the target cell and the beam concurrently. In an eighteenth aspect, alone or in combination with one or more of the first through seventeenth aspects, the UE is configured to select the target cell and the beam sequentially.

In a nineteenth aspect, alone or in combination with one or more of the first through eighteenth aspects, the UE is configured to re-evaluate and select the target cell and the beam based at least in part on a failure of the conditional handover procedure. In a twentieth aspect, alone or in combination with one or more of the first through nineteenth aspects, the source cell is a standalone source node, a source master node, or a source secondary node and the target cell is a standalone target node, a target master node, or a target secondary node. In a twenty-first aspect, alone or in combination with one or more of the first through twentieth aspects, the UE is configured to select a plurality of beams of a plurality of candidate target cells concurrently.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
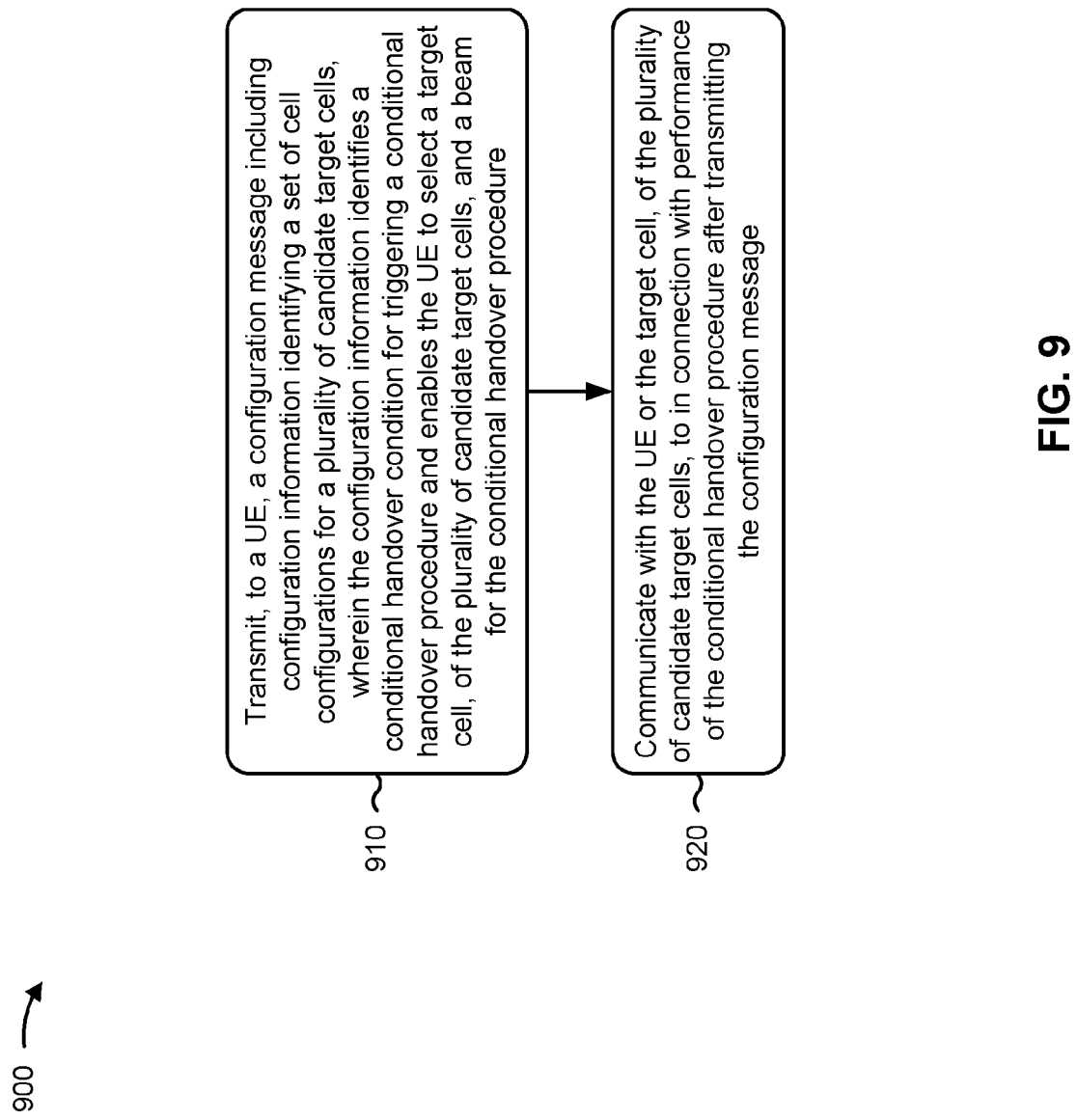
FIG. 9 is a diagram illustrating an example process performed, for example, by a source cell, in accordance with various aspects of the present disclosure.

FIG. 9 is a diagram illustrating an example process 900 performed, for example, by a source cell, in accordance with various aspects of the present disclosure. Example process 900 is an example where a source cell (e.g., BS 110) enables cell and beam selection for a conditional handover procedure.

As shown in FIG. 9, in some aspects, process 900 may include transmitting, to a UE, a configuration message including configuration information identifying a set of cell configurations for a plurality of candidate target cells, wherein the configuration information identifies a conditional handover condition for triggering a conditional handover procedure and enables the UE to select a target cell, of the plurality of candidate target cells, and a beam for the conditional handover procedure (block 910). For example, the source cell (e.g., using controller/processor 240, transmit processor 220, TX MIMO processor 230, MOD 232, antenna 234, and/or the like) may transmit, to a UE, a configuration message including configuration information identifying a set of cell configurations for a plurality of candidate target cells, as described in more detail above. In some aspects, the configuration information identifies a conditional handover condition for triggering a conditional handover procedure and enables the UE to select a target cell, of the plurality of candidate target cells, and a beam for the conditional handover procedure.

As shown in FIG. 9, in some aspects, process 900 may include communicating with the UE or the target cell, of the plurality of candidate target cells, to in connection with performance of the conditional handover procedure after transmitting the configuration message (block 920). For example, the source cell (e.g., using antenna 234, DEMOD 232, MIMO detector 236, receive processor 238, controller/processor 240, transmit processor 220, TX MIMO processor 230, MOD 232, antenna 234, and/or the like) may communicate with the UE or the target cell, of the plurality of candidate target cells, to in connection with performance of the conditional handover procedure after transmitting the configuration message, as described in more detail above.

Process 900 may include additional aspects, such as any single aspect and/or any combination of aspects described below and/or in connection with one or more other processes described elsewhere herein.

In a first aspect, the conditional handover condition includes an information element identifying at least one of: a candidate cell identifier for a candidate target cell of the plurality of candidate target cells, a candidate cell threshold offset, a beam list, a beam threshold, or a priority indicator. In a second aspect, alone or in combination with the first aspect, the conditional handover condition relates to a measurement identifier. In a third aspect, alone or in combination with one or more of the first and second aspects, the conditional handover condition relates to a beam quality of beams of the plurality of candidate target cells.

In a fourth aspect, alone or in combination with one or more of the first through third aspects, the beam quality is identified using random access channel signaling. In a fifth aspect, alone or in combination with one or more of the first through fourth aspects, the beam quality is identified in the configuration message. In a sixth aspect, alone or in combination with one or more of the first through fifth aspects, the source cell is configured to receive a measurement report from the UE in connection with the conditional handover procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a base station, a configuration message including configuration information identifying a conditional handover condition for triggering a conditional handover procedure;
    determining a set of cell quality measurements for a set of candidate target cells;
    selecting a target cell, from the set of candidate target cells, and a beam, of one or more beams of the target cell, for a conditional handover procedure and based at least in part on the set of cell quality measurements; and
    performing the conditional handover procedure to transfer from a source cell to the target cell based at least in part on selecting the target cell and the beam and based at least in part on the conditional handover condition.

2. The method of claim 1, wherein the UE is configured to determine the set of cell quality measurements based at least in part on at least one of a per-beam layer 1 (L1) filtered measurement or a cell-level layer 3 (L3) measurement.

3. The method of claim 1, wherein the UE is configured to select the target cell based at least in part on at least one of:
    the target cell having a higher cell quality than one or more other candidate target cells of the set of candidate target cells,
    an index value of the target cell,
    a cell quality of the target cell satisfying a threshold,
    a cell priority of the target cell,
    a comparison of a single beam of each candidate target cell, of the set of candidate target cells, associated with a cell quality that satisfies a threshold,
    a beam quality of the beam of the target cell relative to other beam qualities of other candidate target cells of the set of candidate target cells,
    a beam quality of the beam of the target cell satisfying a threshold,
    a priority of the target cell,
    a comparison of at least one beam of a candidate target cell, of the set of candidate target cells, associated with a beam quality that satisfies a threshold,
    a beam set quality associated with a plurality of beams of the target cell,
    a beam set quality relative to other beam set qualities of other candidate target cells of the set of candidate target cells,
    a beam set quality satisfying a threshold,
    an index of the target cell, or
    a priority of the target cell.

4. The method of claim 1, wherein the UE is configured to select the target cell associated with the beam and to select the beam based at least in part on at least one of:
    a beam quality,
    an index value of the beam, or
    a priority of the beam.

5. The method of claim 1, wherein the UE is configured to select the target cell and the beam concurrently or sequentially.

6. The method of claim 1, wherein the UE is configured to re-evaluate and select the target cell and the beam based at least in part on a failure of the conditional handover procedure.

7. The method of claim 1, wherein the source cell is a standalone source node, a source master node, or a source secondary node and the target cell is a standalone target node, a target master node, or a target secondary node.

8. The method of claim 1, wherein the UE is configured to select a plurality of beams of the set of candidate target cells concurrently.

9. A method of wireless communication performed by a source cell, comprising:
 transmitting, to a user equipment (UE), a configuration message including configuration information identifying a set of cell configurations for a set of candidate target cells,
  wherein the configuration information identifies a conditional handover condition for triggering a conditional handover procedure and enables the UE to select a target cell, of the set of candidate target cells, and a beam for the conditional handover procedure; and
 communicating with the UE or the target cell, of the set of candidate target cells, in connection with performance of the conditional handover procedure after transmitting the configuration message.

10. The method of claim 9, wherein the conditional handover condition includes an information element identifying at least one of: a candidate cell identifier for a candidate target cell of the set of candidate target cells, a candidate cell threshold offset, a beam list, a beam threshold, or a priority indicator, and
 wherein the conditional handover condition relates to at least one of:
  a measurement identifier, or
  a beam quality of beams of the set of candidate target cells.

11. A user equipment (UE) for wireless communication, comprising:
 a memory; and
 one or more processors operatively coupled to the memory, the memory and the one or more processors configured to:
  receive, from a base station, a configuration message including configuration information identifying a conditional handover condition for triggering a conditional handover procedure;
  determine a set of cell quality measurements for a set of candidate target cells;
  select a target cell, from the set of candidate target cells, and a beam, of one or more beams of the target cell, for a conditional handover procedure and based at least in part on the set of cell quality measurements; and
  perform the conditional handover procedure to transfer from a source cell to the target cell based at least in part on selecting the target cell and the beam and based at least in part on the conditional handover condition.

12. The UE of claim 11, wherein the UE is configured to determine the set of cell quality measurements based at least in part on at least one of a per-beam layer 1 (L1) filtered measurement or a cell-level layer 3 (L3) measurement.

13. The UE of claim 11, wherein the UE is configured to select the target cell based at least in part on the target cell having a higher cell quality than one or more other candidate target cells of the set of candidate target cells.

14. The UE of claim 11, wherein the UE is configured to select the target cell based at least in part on an index value of the target cell and based at least in part on a cell quality of the target cell satisfying a threshold.

15. The UE of claim 11, wherein the UE is configured to select the target cell based at least in part on a cell priority of the target cell and based at least in part on a cell quality of the target cell satisfying a threshold.

16. The UE of claim 11, wherein the UE is configured to select the target cell based at least in part on a comparison of a single beam of each candidate target cell, of the set of candidate target cells, associated with a cell quality that satisfies a threshold.

17. The UE of claim 11, wherein the UE is configured to select the target cell based at least in part on a beam quality of the beam of the target cell relative to other beam qualities of other candidate target cells of the set of candidate target cells.

18. The UE of claim 11, wherein the UE is configured to select the target cell based at least in part on an index value of the target cell and based at least in part on abeam quality of the beam of the target cell satisfying a threshold.

19. The UE of claim 11, wherein the UE is configured to select the target cell based at least in part on a priority of the target cell and based at least in part on a beam quality of the beam of the target cell satisfying a threshold.

20. The UE of claim 11, wherein the UE is configured to select the target cell based at least in part on a comparison of at least one beam of a candidate target cell, of the set of candidate target cells, associated with a beam quality that satisfies a threshold.

21. The UE of claim 11, wherein the UE is configured to select the beam based at least in part on a beam quality and to select the target cell associated with the beam.

22. The UE of claim 11, wherein the UE is configured to select the beam based at least in part on a beam quality and an index value of the beam and to select the target cell associated with the beam.

23. The UE of claim 11, wherein the UE is configured to select the beam based at least in part on a beam quality and a priority of the beam and to select the target cell associated with the beam.

24. The UE of claim 11, wherein the UE is configured to select the target cell based at least in part on a beam set quality associated with a plurality of beams of the target cell.

25. A source cell for wireless communication, comprising:
 a memory; and
 one or more processors operatively coupled to the memory, the memory and the one or more processors configured to:
  transmit, to a user equipment (UE), a configuration message including configuration information identifying a set of cell configurations for a set of candidate target cells,
   wherein the configuration information identifies a conditional handover condition for triggering a conditional handover procedure and enables the UE to select a target cell, of the set of candidate target cells, and a beam for the conditional handover procedure; and
  communicate with the UE or the target cell, of the set of candidate target cells, atoll in connection with performance of the conditional handover procedure after transmitting the configuration message.

26. The source cell of claim 25, wherein the conditional handover condition includes an information element identifying at least one of: a candidate cell identifier for a candidate target cell of the set of candidate target cells, a candidate cell threshold offset, a beam list, a beam threshold, or a priority indicator.

27. The source cell of claim 25, wherein the conditional handover condition relates to a measurement identifier.

28. The source cell of claim 25, wherein the conditional handover condition relates to a beam quality of beams of the set of candidate target cells.

29. The source cell of claim 28, wherein the beam quality is identified using random access channel signaling.

30. The source cell of claim 28, wherein the beam quality is identified in the configuration message.

31. The source cell of claim 25, wherein the source cell is configured to receive a measurement report from the UE in connection with the conditional handover procedure.

* * * * *